(12) United States Patent
Olson et al.

(10) Patent No.: US 6,991,082 B2
(45) Date of Patent: Jan. 31, 2006

(54) BALL PANEL

(75) Inventors: Mark Lyle Olson, Jamestown, ND (US); James Michael Schaff, Jamestown, ND (US); Wesley Keith Stegmiller, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/732,104

(22) Filed: Dec. 10, 2003

(65) Prior Publication Data

US 2005/0126879 A1     Jun. 16, 2005

(51) Int. Cl.
    *B65G 13/11*    (2006.01)
(52) U.S. Cl. ........................................ 193/35
(58) Field of Classification Search ........... 193/35 MD
    See application file for complete search history.

(56) References Cited

U.S. PATENT DOCUMENTS

| | | | |
|---|---|---|---|
| 3,466,697 A | 9/1969 | Huber et al. ................. 16/26 |
| 3,739,894 A * | 6/1973 | Hinman ................. 193/35 MD |
| 4,108,455 A | 8/1978 | James et al. ............. 280/43.23 |
| 4,689,847 A * | 9/1987 | Huber ............................ 16/26 |
| 4,784,194 A * | 11/1988 | Danner ................. 193/35 MD |
| 5,358,337 A * | 10/1994 | Codatto ................. 193/35 MD |
| 5,415,266 A * | 5/1995 | van der Werff ........ 193/35 MD |
| 6,039,288 A | 3/2000 | Huber et al. ............. 244/118.1 |
| 6,125,984 A | 10/2000 | Huber et al. .................. 193/35 |
| 2003/0103698 A1 | 6/2003 | Gasal et al. .................. 384/49 |

OTHER PUBLICATIONS

International Search Report for PCT/US2004/041033.
Written Opinion for PCT/US2004/041033.

* cited by examiner

*Primary Examiner*—Gene O. Crawford
*Assistant Examiner*—Mark A. Deuble
(74) *Attorney, Agent, or Firm*—Womble Carlyle Sandridge & Rice, PLLC

(57) ABSTRACT

A ball panel for use in a load handling system such as an aircraft cargo hold comprises a top skin having at least one raised support. The ball panel also comprises a corrugation and a bottom skin. The top skin is supported by the corrugation, which has a plurality of side walls, flanges and folded ends. The raised support can be an annular ring, having a ramp between the top skin and a ball transfer unit.

8 Claims, 6 Drawing Sheets

BALL PANEL

FIELD OF THE INVENTION

The invention relates to a ball panel for use in supporting ball transfer units (BTU) in load handling systems, such as in the cargo compartment of an aircraft.

BACKGROUND OF THE INVENTION

Cargo compartments of military and commercial aircraft carry freight within industry-standard containers known as Unit Load Devices (ULD). The sizes and weights of ULDs vary considerably depending upon the goods transported and the characteristics of the cargo compartment. Load handling personnel must be able to rapidly load, place and unload ULDs within the cargo bay in order to minimize down time and delays.

Ball panels are among the conveyance equipment used as the primary load bearing surfaces to move ULDs in, around and out of aircraft cargo compartments where omni directional conveyance is required, such as in the doorway. Several ball panels (sometimes referred to as ball mats) can be arranged to define the deck surface of a cargo hold.

A ball panel consists of ball transfer units (BTU) and a ball panel housing. Several BTUs are inserted into openings in the top of a ball panel housing. An example of a conventional BTU is shown in U.S. Pat. No. 3,739,894, Ball Transfer Unit. A BTU comprises a case containing a ball that protrudes upwardly from the housing to contact the bottom surface of a ULD. The ball is supported resiliently within the case on a ball race or other low friction device. A standard one-inch diameter ball of the BTU is situated such that the top tangent point of the ball, which in combination with other BTUs establishes a conveyor plane, typically is 0.25 inches (6.35 mm) above the top skin of the panel. When ULDs have a planar bottom surface, this design provides 0.25 inches (6.35 mm) of clearance between a top skin of the ball panel and the ULD bottom surface.

Over time, and after exposure to arduous handling conditions, ULDs can wear or become damaged. The bottom panel of some ULD designs can sag due to use or damage, and become uneven. When the unevenness develops such that the distance between the lowest and highest point in the bottom panel of the ULD exceeds 0.25 inches (6.35 mm), a portion of the ULD will come in contact with the top skin of the ball panel, although another portion of the ULD bottom panel remains supported on the ball of the BTU. Consequently, the ULD will drag, which could lead to further damage to the ULD, as well as inhibit the ease of moving the ULD around a cargo bay. Moreover, the sagging ULD could damage the top skin of the ball panel and the BTU itself. Standard BTUs are in existing inventories of many maintenance departments. While BTUs can be replaced relatively quickly, the replacement or repair of a ball panel can be timely and expensive.

Thus there is a need for an improved ball panel design that addresses the problems caused by sagging and damaged ULDs, and that avoids costly repairs to the ball panels and their components.

SUMMARY OF THE INVENTION

The present invention is directed to a ball panel for use in a load handling system such as aircraft cargo hold. The ball panel comprises a top skin having at least one raised support. The ball panel also comprises a corrugation and a bottom skin. The top skin is supported by the corrugation, which has a plurality of side walls, flanges and folded ends. The raised support can be an annular ring, having a ramp between the top skin and a ball transfer unit.

These and other aspects of the present invention will become apparent to those skilled in the art after a reading of the following description of the preferred embodiments, when considered in conjunction with the drawings. It should be understood that both the foregoing general description and the following detailed description are exemplary and explanatory only and are not restrictive of the invention as claimed.

DETAILED DESCRIPTION

Figure 1:
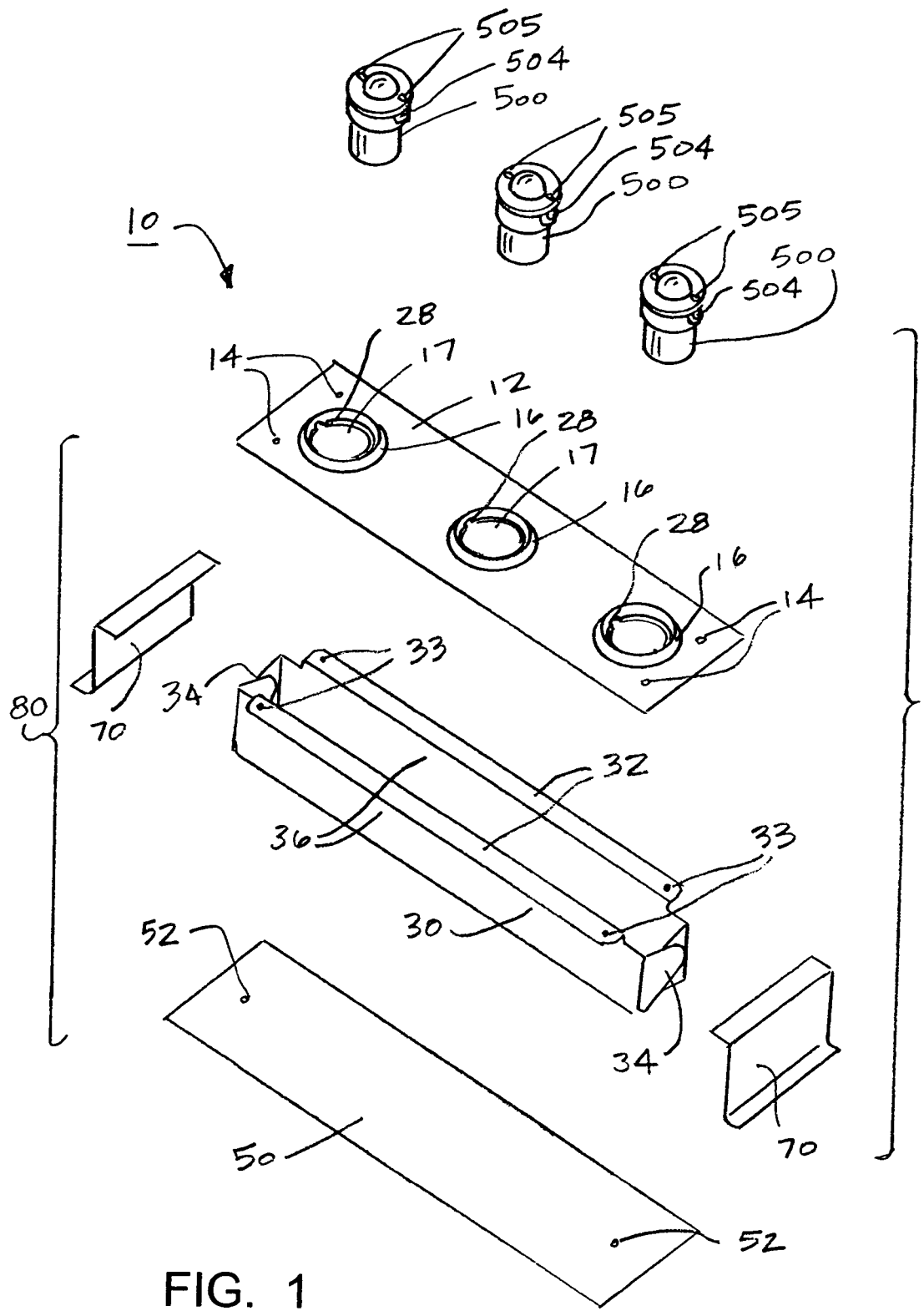
FIG. 1 is an exploded perspective view of a ball panel assembly of the present invention.

FIG. 1 shows in exploded view a ball panel assembly 10 of the present invention in a preferred embodiment. A top skin 12, corrugation 30, bottom skin 50, and closeouts 70 form a housing 80 that receives the BTUs 500.

The top skin 12 preferably has at least one raised support 16 thereon. The raised support 16 has an opening 17 that is configured to contain a ball transfer unit 500. Alignment holes 14 can be located on the top skin 12 to facilitate alignment with the corrugation 30. The top skin can be machined from aluminum, and have a thickness in areas not around the raised supports 16 of about 0.03 inches (0.76 mm) to about 0.08 inches (2.03 mm).

The corrugation 30 can be formed from a single sheet of aluminum sheet metal or other structural member, with a thickness of about 0.03 inches (0.76 mm) to 0.10 (2.54 mm) inches. When formed in the embodiment shown, the corrugation 30 has flanges 32, and folded ends 34. The flanges 32 can have flange holes 33 to assist with assembly. The side walls 36 are sized and positioned to provide a load path from the raised supports 16, through the side walls 36, through the bottom skin 50 to the aircraft support structure (not shown). In a preferred embodiment, the height of side walls 36 range from about 0.75 (19.05 mm) to 2.50 (63.50 mm). Although depicted as solid, corrugation 30 may have cutouts or voids for weight reduction or other purposes. Alternatively, the corrugation can be formed by way of extrusion, or by molded composite material, such as fiberglass or resin material.

The bottom skin 50 preferably can be machined from aluminum, and have a thickness of about 0.02 (0.51 mm) to about 0.06 (1.52 mm). Bosses 52 in the bottom skin 50 facilitate assembly with the corrugation 30.

The closeouts 70 also can be formed from a single sheet of aluminum sheet metal, with a thickness of about 0.03 (0.76 mm) to 0.10 (2.54 mm).

To assemble, the top skin 12 is placed upon the flanges 32, positioning the alignment holes 14 of the top skin 12 atop the flange holes 33 of the flanges 32. Standard retaining means, such as rivets (not shown) can attach the top skin 12 to the flanges 32. The top skin can also be bonded to the flanges with adhesive (not shown). Similarly, the closeouts 70 can be mechanically attached and/or bonded with adhesive (not shown) to the folded ends 34, the top skin 12, and bottom skin 50. The corrugation 30 is placed upon the bottom skin 50 by aligning the bosses 52 with the corrugation holes 35 (shown in FIG. 3). The bottom skin 50 can then be mechanically and/or adhesively attached to the corrugation 30 and closeouts 70 to form the housing 80. The housing 80, as shown in FIG. 1, therefore comprises the top skin 12, the corrugation 30, the closeouts 70, and the bottom skin 50. The housing 80 is combined with the BTUs 500 to form the ball panel assembly 10.

Figure 2:
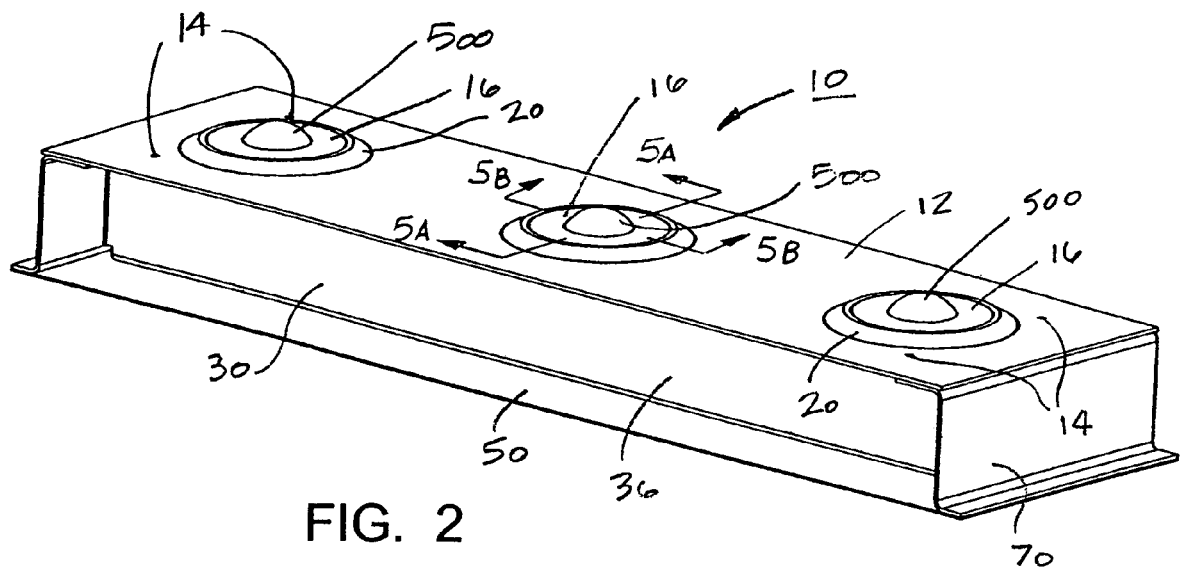
FIG. 2 is a front perspective view of a ball panel assembly of the present invention.

FIG. 2 shows a ball panel assembly 10 in a preferred embodiment containing 3 BTUs 500.

Figure 3:
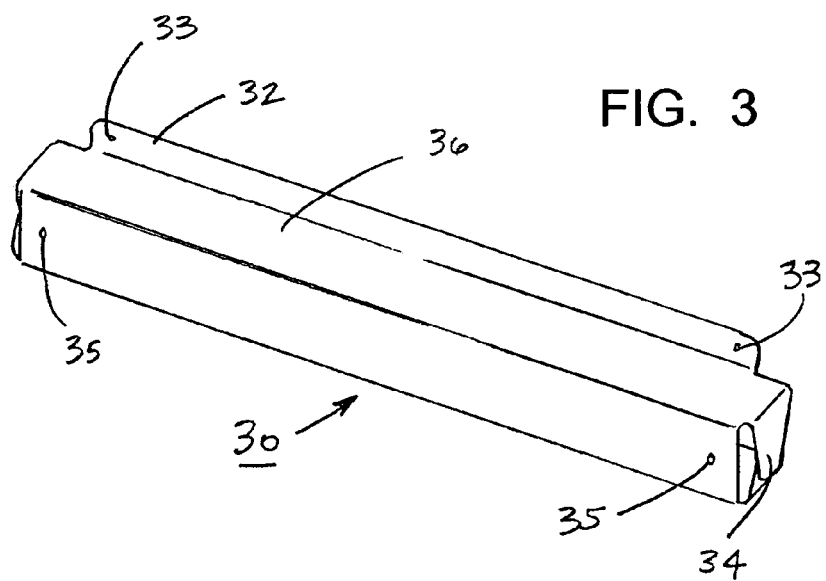
FIG. 3 is a bottom perspective view of a corrugation portion of a ball panel assembly of the present invention.

FIG. 3 depicts a rear perspective of the corrugation 30 in a preferred embodiment. The flanges 32, flange holes 33, folded ends 34, corrugation holes 35 and side walls 36 are shown thereon.

Figure 4:
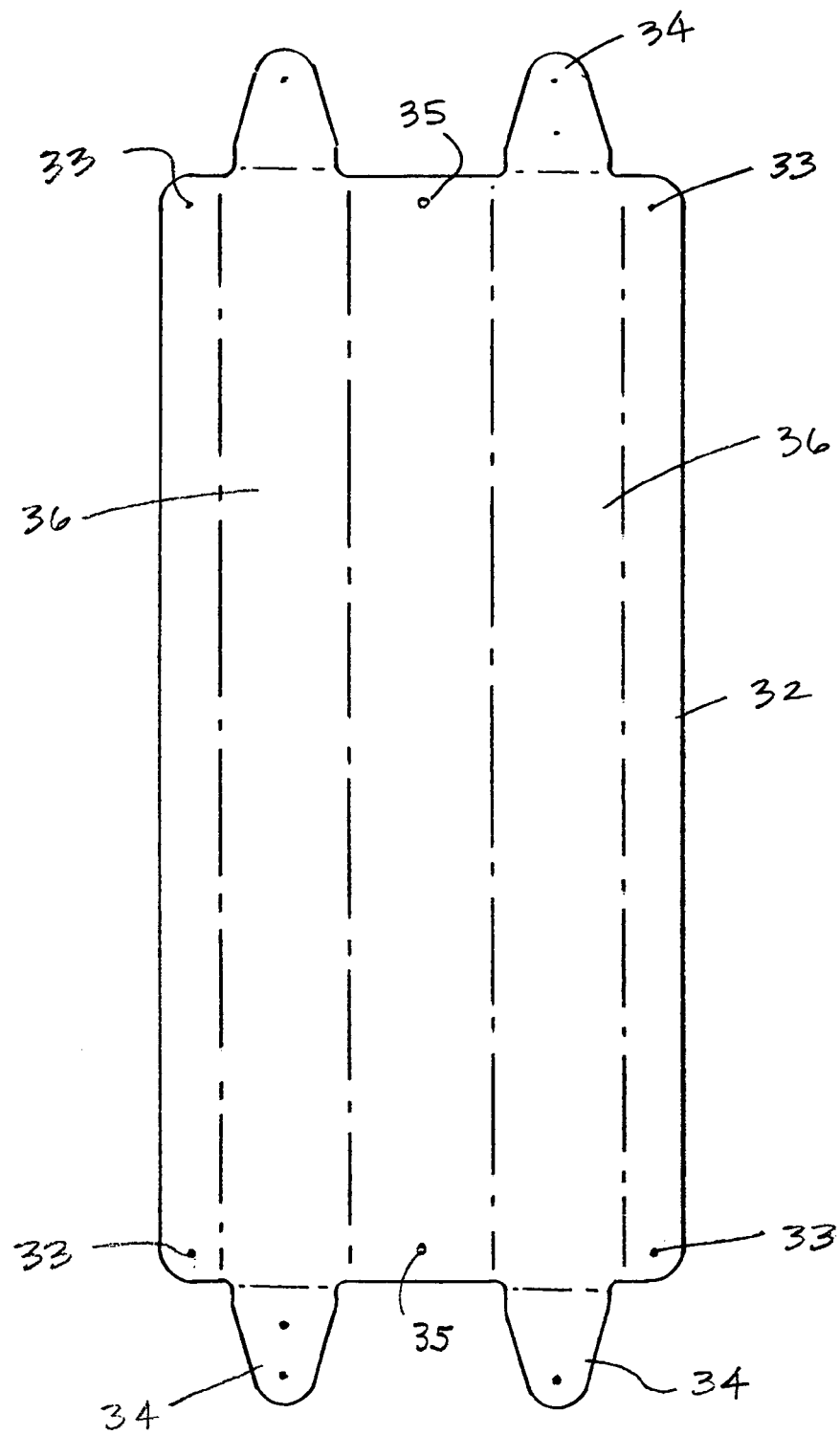
FIG. 4 illustrates a portion of the ball panel assembly in a pre-folded sheet configuration.

FIG. 4 illustrates the corrugation 30 in a preferred embodiment shown its pre-folded sheet configuration. Areas that will become the side walls 36, folded ends 34, flanges 32, flange holes 33 and corrugation holes 35 are depicted. The fold lines are shown in dashed lines. In general, the corrugation has a pre-folded configuration having a generally rectangular and symmetrical shape, with two arcuate sections on each of a top and a bottom, the arcuate sections having exterior edges, and two side sections that extend beyond a line formed by the exterior edges of each of the arcuate sections.

Figure 5A:
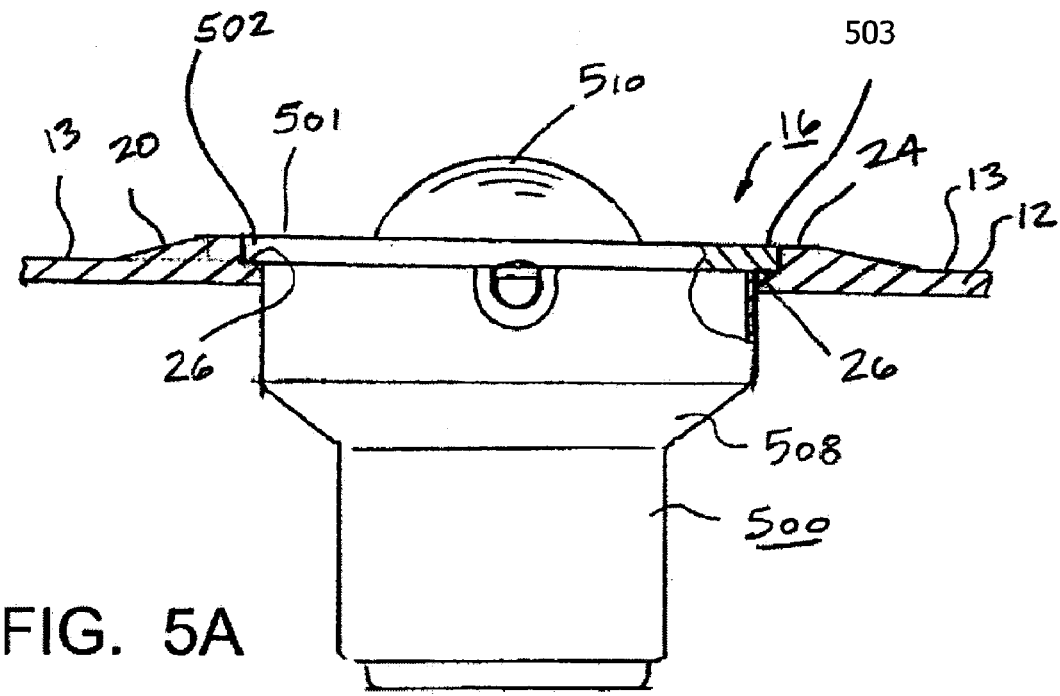
FIGS. 5A and 5B are cross-section views of a ball panel assembly of the present invention.
Figure 5B:
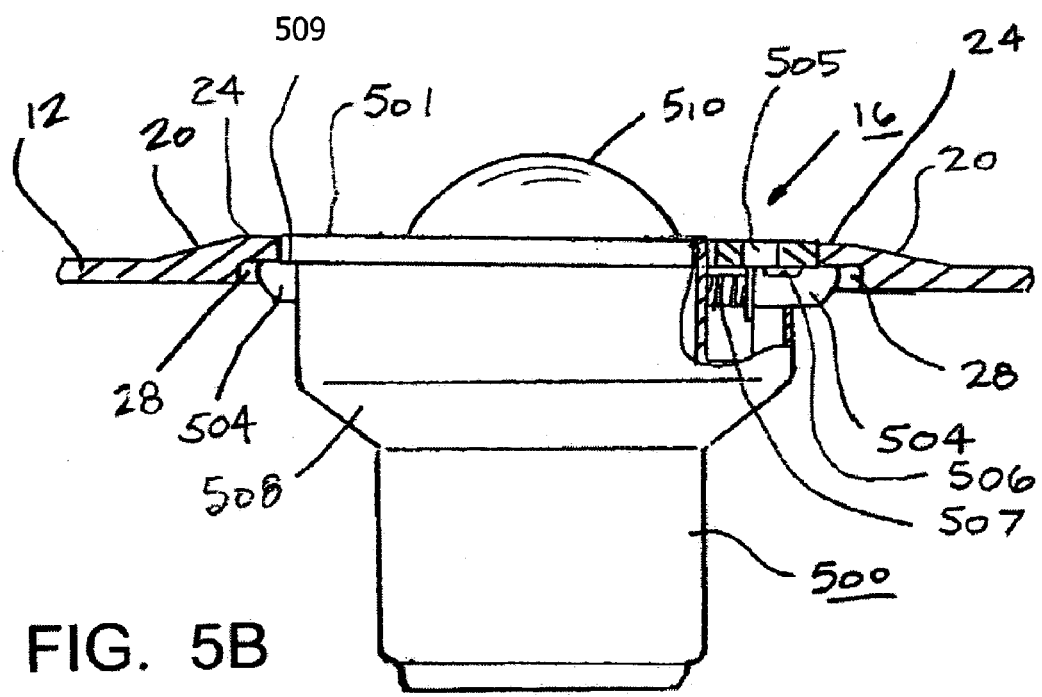

FIGS. 5A and 5B illustrate cross-sectional views taken along the lines 5A—5A and 5B—5B, respectively as shown in FIG. 2. A conventional BTU 500 is located within the opening 17 (as shown in FIG. 1) of the raised support 16. In a preferred embodiment, the raised support 16 is an annular ring, having a ramp 20 and top surface 24. As shown in FIGS. 5A and 5B, the ramp 20 can be a constant sloped surface from the top surface 24 to the top skin surface 13. The ramp 20 and term "ramp" shall also include configurations, which have a radius or varying multi-sloped planar surfaces as well. Within the opening 17, and below the top surface 24, a lip 26 can support a shoulder 502 of the BTU. The shoulder 502 has a lower edge surface 509 of the annular cover 501. In a preferred embodiment, the annular cover surface 503 of the annular cover 501, when installed, is in the same plane with the top surface 24.

The BTUs in a preferred embodiment are not supported or resting on or contacting directly with the bottom skin. The BTUs in a preferred embodiment also are not supported within the housing 80 by the sloped surface 508. Rather, in this invention, the load of the ULD is transferred through the cover 501, through the shoulder 502, to the top skin 12.

As shown in FIG. 5B, notches 28, that are within the opening 17 and on the top skin 12, function to receive spring-loaded locking tabs 504 of BTUs 500. Depression of the locking tabs 504 permit selective removal and replacement of BTUs 500 from the opening 17. To remove the BTU, a small screwdriver or other implement is inserted into the hole 505 to engage notches 506 and push the locking tab 504 against the spring 507. By this action, the locking tab 504 is moved inwardly and out of engagement with the lip 26 and top surface 24, allowing the BTU 500 to be lifted out and removed from the housing 80. A BTU similarly is inserted into an opening 17 of a housing 80 by pressing the BTU into the opening, and allowing the top surface 24, then lip 26 to press against the locking tabs 504, causing them to move inwardly against spring 507, and then move outwardly after clearing the lip 26, and fitting within the notch 28. No tools, however, are required for insertion of a BTU 500. In a preferred embodiment, each BTU has two sets of locking tabs 504, situated about 180 degrees from one another as shown in FIG. 5B.

Figure 6:
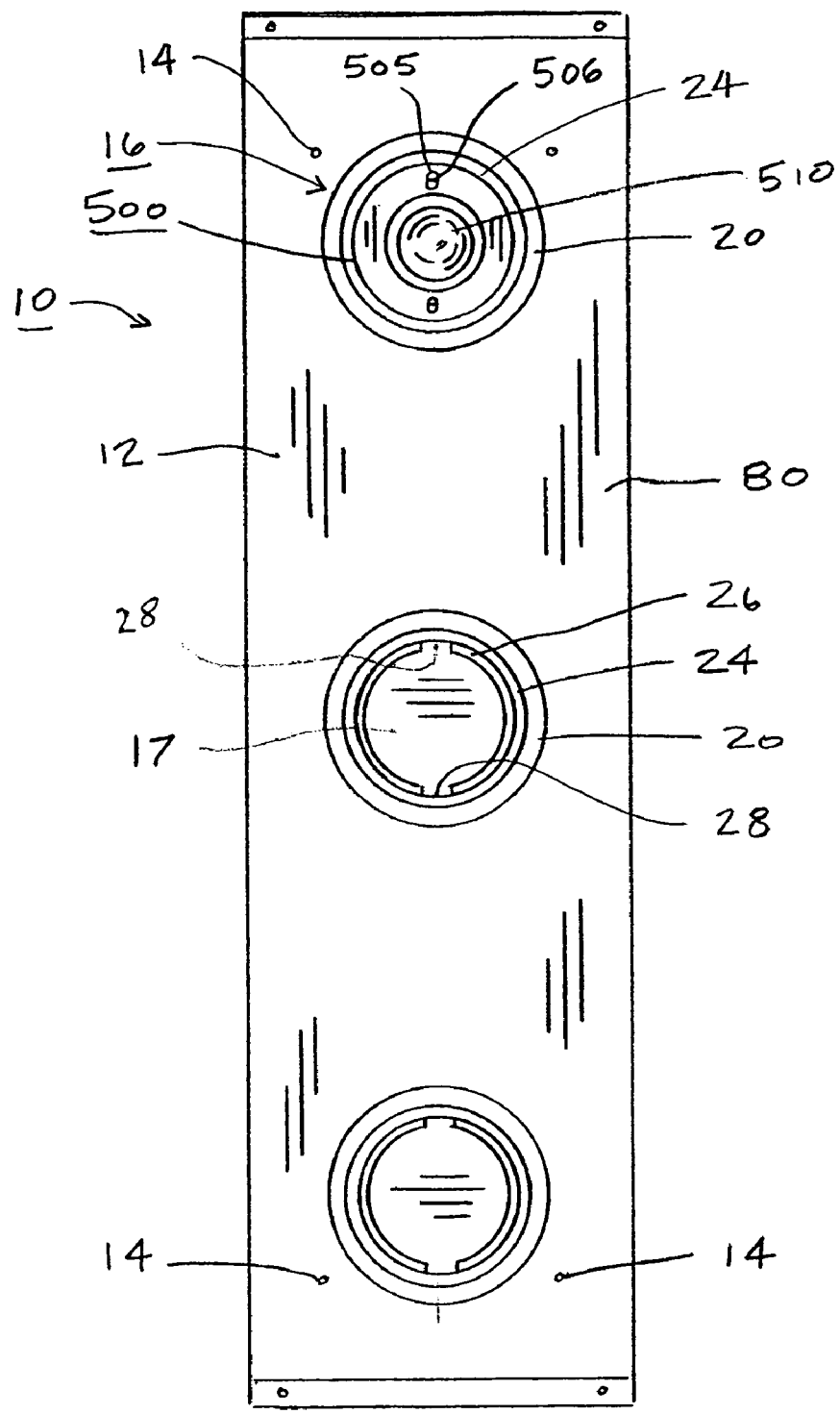
FIG. 6 is a depiction of a plan view of a ball panel assembly of the present invention.

FIG. 6 shows a plan view of a ball panel assembly, containing the housing 80 and BTUs 500. In this configuration, the top skin 12 comprises openings for three BTUs 500, although only one BTU is shown installed in FIG. 6 for ease of illustration. Alignment holes 14, raised supports 16, ramp 20, and top surface 24 are depicted. For the center located opening 17, a notch 28 and interior lip 26 await receipt of a BTU for mating engagement and support, respectively. As shown, the interior lip extends substantially circumferentially within the opening 17 to provide an adequate support shelf for the shoulder 502 (as shown in FIGS. 5A and 5B) of the BTU 500.

Figure 7:
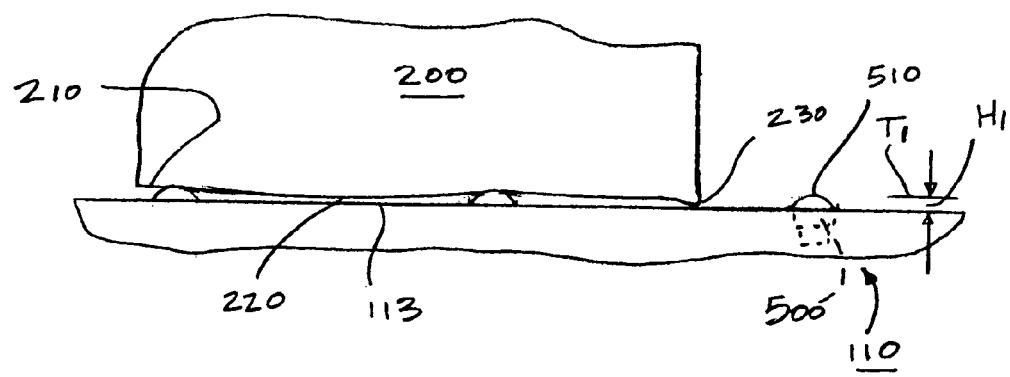
FIG. 7 is a depiction of a side view of a prior art ball panel assembly and ULD.

FIG. 7 illustrates a side view configuration showing conventional BTUs 500 mounted in a prior art ball panel 110. The line T1 is defined as the line (or plane if viewed in three dimensions) that is tangent to the top of each ball 510 of the ball panel assemblies. In the prior art arrangement, line T1 is a height H1 above the top skin surface 113. H1 typically is about 0.25 (6.35 mm). When ULDs have a planar bottom surface, this design provides 0.25 (6.35 mm) of clearance between a top skin surface 113 of the ball panel 110 and the ULD bottom surface 210. A conventional, but well-used ULD 200 is shown atop the BTUs 500 in FIG. 7. The bottom panel 210 of the ULD 200 is shown sagging and is no longer planar. A sag point 220 can come in contact with the top skin surface 113 of the prior art ball panel 110, causing damage to the ULD and the ball panel. Also, a damaged corner 230 of the ULD 200 can harm or create jamming against a BTU 500, if the point of the corner 230 contacts the BTU at a certain angles.

Figure 8:
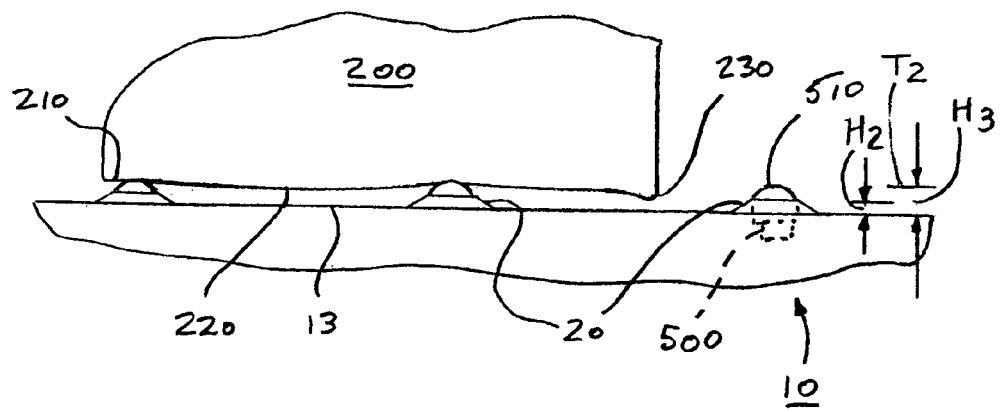
FIG. 8 is a depiction of a side view of a ball panel assembly and ULD of the present invention.

FIG. 8 illustrates a side view configuration showing conventional BTUs 500, but mounted in a preferred embodiment of a ball panel assembly 10 of this invention. Here the distance between the line T2 (defined as the line that is tangent to the top of each ball 510 of the ball panel assemblies) and the top skin surface 13 is height H3. Preferably, H3 is about 0.39 inches (10 mm) or larger. This height is achieved by raising the effective height of the BTUs a distance H2 from the top skin surface 13. Preferably, H2 is about 0.14 inches (3.66 mm) or larger. Since standard BTUs have an exposed ball height of about 0.25 inches (6.35 mm), the resulting clearance is about 0.39 inches (10 mm). In this preferred embodiment, the ratio of H1 to H2 is about 1.8. In order for the ramp to be effective in deflecting corner loads, H2 preferably should be a minimum of 0.05 inches (1.27 mm), yielding a preferred maximum ratio of H1 to H2 of about 5.0 to 1.0. The ramp height H2 could be higher based upon specified requirements. Thus ratios lower than 1.8 also are preferred. The distance H2 in the stated ranges serve to minimize the jamming and dragging that results with some sagging, non-planar ULDs. In sum, the ratio of H1 to H2 preferably is less than about 5 to 1, and most preferably less than about 1.8 to 1.0. If the height H1 remains constant, such as the case where no change in BTU is desired, the ratio is dependent solely on changes to H2.

The annular ring raised supports 16 not only provide additional clearance, but can operate to provide protection from side impacts. As shown in FIG. 8, the ramp 20 can serve to deflect upwardly damaged corners or edges of ULDs, to help minimize damage to the ULD and BTUs. Allowing a damaged ULD corner or edge to contact the ramp, as opposed to the BTU, allows the ball panel housing 80 to absorb and transfer the impact and static loads as opposed to the BTU. Preferably, the top skin is machined such that the annular ring is integral with the top skin. This construction can allow for added strength properties and allow the use of conventional BTUs that have a standard 0.25 inch protruding ball.

The housing 80 of the present design is an improvement over prior art designs. The housing of the present design combines the benefits of raised supports with corrugation constructions. Also, this design utilizes a substantially circumferential support shoulder to retain the upper lip portion of the BTU. Prior art designs were of heavier overall construction. Prior art designs had weaker, retaining tabs attempting to support the load of the BTU, which in turn was supporting the load of a ULD. Also, prior designs without the raised supports caused the conveyor additional drag due to the dragging of damaged or sagged ULDs during loading, unloading and relocating within the cargo bay. Thus in some situations the use of damaged or sagging ULDs could lead to damages to the ball panel directly, even while the BTU themselves were unharmed.

The housing 80 of the ball panel assembly 10 preferably is designed to withstand loads greater than the BTU 500. Consequently under heavy load conditions, the BTU should fail prior to the housing 80, creating in effect a mechanical fuse in the load path. In general, BTUs can be less expensive to replace than ball panels. For example, during tests of a ball panel of the present invention, loads in the vertical direction of up to 2300 pounds were experienced with no failure of the housing 80.

The phrase "contact" or "in contact with" as used herein shall mean the immediate proximity of two objects, regardless of whether actual physical contact does or does not occur or whether adhesives or mechanical connections prevent the actual physical contact of the two objects.

While preferred embodiments of the present invention have been described above, it is to be understood that any and all equivalent realizations of the present invention are included within the scope and spirit thereof. Thus, the embodiments depicted are presented by way of example only and are not intended as limitations upon the present invention. While particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

We claim:

1. A ball panel housing for use in a load handling system, the ball panel housing comprising:
   a top skin having at least one raised support, the raised support having a top surface;
   a corrugation having a plurality of side walls, the corrugation supporting the top skin; and
   a ramp between the top skin and top surface;
   where the raised support is configured to contain a ball transfer unit, and where the corrugation further comprises at least one flange that extends from the side wall, the flange being in contact with the top skin.

2. The ball panel housing of claim 1 where the flanges have at least one flange hole for alignment with at least one alignment hole on the top skin.

3. The ball panel housing of claim 1, where the corrugation is formed from a single sheet of metal.

4. A ball panel housing for use in a load handling system, the ball panel housing comprising:
   a top skin having at least one raised support, the raised support having a top surface;
   a corrugation having a plurality of side walls, the corrugation supporting the top skin; and
   a ramp between the top skin and top surface;
   where the raised support is configured to contain a ball transfer unit; and
   where the corrugation has a pre-folded configuration having a generally rectangular and symmetrical shape, with two arcuate sections on each of a top and a bottom, the arcuate sections having exterior edges, and two side sections that extend beyond a line formed by the exterior edges of each of the arcuate sections.

5. A ball panel housing for use in a load handling system, the ball panel housing comprising:
   a top skin having at least one raised support, the raised support having a top surface; and
   a corrugation having a plurality of side walls, the corrugation supporting the top skin;
   a ramp between the top skin and top surface;
   where the raised support is configured to contain a ball transfer unit, and
   further comprising a bottom skin that supports the side walls of the corrugation, where the bottom skin has at least one boss for alignment with at least one hole in a bottom portion of the corrugation.

6. A ball panel housing for use in a load handling system, the ball panel housing comprising:
   a top skin having at least one raised support, the raised support having a top surface; and
   a corrugation having a plurality of side walls, the corrugation supporting the top skin;
   a ramp between the top skin and top surface;
   where the raised support is configured to contain a ball transfer unit, and
   further comprising a bottom skin that supports the side walls of the corrugation,
   where the corrugation further comprises at least one closeout, the closeout in contact with the bottom skin, the corrugation and the top skin.

7. A ball panel for use in a cargo bay of an aircraft, the ball panel comprising:
   a housing having a top skin, the top skin having at least one annular ring, the annular ring having a top surface and a support lip;
   a ball transfer unit, contained within the annular ring and having a protruding ball, and an annular cover having a shoulder;
   the annular ring having a ramp between the top skin and the top surface;
   where the shoulder is supported by the support lip, both of which extend substantially circumferentially within the annular ring, and
   where the housing further comprises a corrugation supporting the top skin, the corrugation having a plurality of side walls, folded ends and at least one flange.

8. The ball panel of claim 7, where the corrugation has a pre-folded configuration having a generally rectangular and symmetrical shape, with two arcuate sections on each of a top and a bottom, the arcuate sections having exterior edges, and two side sections that extend beyond a line formed by the exterior edges of each of the arcuate sections.

* * * * *